United States Patent
Kihara et al.

(10) Patent No.: US 7,029,791 B2
(45) Date of Patent: Apr. 18, 2006

(54) MANUFACTURING METHOD OF POSITIVE ACTIVE MATERIAL FOR ALKALINE STORAGE BATTERY, NICKEL ELECTRODE USING THE SAME MATERIAL AND ALKALINE STORAGE BATTERY USING THE SAME NICKEL ELECTRODE

(75) Inventors: Masaru Kihara, Itano-gun (JP); Yoshitaka Baba, Takasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 271 days.

(21) Appl. No.: 09/925,735

(22) Filed: Aug. 6, 2001

(65) Prior Publication Data

US 2002/0039683 A1    Apr. 4, 2002

(30) Foreign Application Priority Data

Aug. 8, 2000  (JP)  .......................... P. 2000-239698

(51) Int. Cl.
- *H01M 4/32* (2006.01)
- *H01M 4/52* (2006.01)
- *C01G 53/04* (2006.01)

(52) U.S. Cl. .................. 429/223; 423/594.19
(58) Field of Classification Search ................ 429/223; 423/594.3, 594.5, 594.19
See application file for complete search history.

(56) References Cited

U.S. PATENT DOCUMENTS

| 5,523,182 A | * | 6/1996 | Ovshinsky et al. | .......... 429/223 |
| 6,333,126 B1 | * | 12/2001 | Maruta | .................. 429/223 |
| 6,576,368 B1 | * | 6/2003 | Ogasawara et al. | .......... 429/223 |

FOREIGN PATENT DOCUMENTS

| JP | 2765008 | | 4/1998 |
| JP | 11-144723 | * | 5/1999 |

\* cited by examiner

*Primary Examiner*—Jonathan Crepeau
(74) *Attorney, Agent, or Firm*—Nixon & Vanderhye P.C.

(57) ABSTRACT

A high capacity alkaline storage battery which exhibits a maintained dischargeability and a reduced excess negative electrode capacity by decreasing the content of γ-NiOOH left in higher order positive active material. To an aqueous solution of a mixture of nickel sulfate, zinc sulfate and cobalt sulfate was gradually added an aqueous solution of sodium hydroxide with stirring to cause the crystallization of nickel hydroxide. Nickel hydroxide thus crystallized was washed, dehydrated, and then dried. To nickel hydroxide was then added dropwise a predetermined amount of an oxidizing agent (NaClO) while being stirred in an aqueous solution of sodium hydroxide which had been kept to a predetermined temperature so that nickel hydroxide as a main component was put in higher order (e.g., average valence is raised to 2.8) Subsequently, to the material was added dropwise a predetermined amount of a reducing agent ($H_2O_2$) so that the higher order nickel hydroxide as a main component was reduced (e.g., average valence is lowered to 2.2). Nickel hydroxide was washed, dehydrated, and then dried to obtain a higher order nickel hydroxide active material (positive active material).

3 Claims, No Drawings

MANUFACTURING METHOD OF POSITIVE ACTIVE MATERIAL FOR ALKALINE STORAGE BATTERY, NICKEL ELECTRODE USING THE SAME MATERIAL AND ALKALINE STORAGE BATTERY USING THE SAME NICKEL ELECTRODE

The present invention relates to an alkaline storage battery such as nickel-hydrogen storage battery and nickel-cadmium storage battery. More particularly, the present invention relates to an improvement in a manufacturing method of a positive active material comprising as a main component nickel hydroxide for nickel electrode.

A nickel electrode to be normally used as a positive electrode for this type of an alkaline storage battery utilizes a reversible reaction involving conversion of divalent nickel hydroxide ($Ni(OH)_2$) to trivalent nickel oxyhydroxide (NiOOH) as represented by the following equation (1) during charge and conversion of trivalent oxyhydroxide (NiOOH) to divalent nickel hydroxide ($Ni(OH)_2$) as represented by the following equation (2) during discharge:

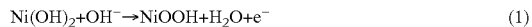

$$Ni(OH)_2 + OH^- \rightarrow NiOOH + H_2O + e^- \quad (1)$$

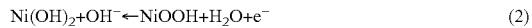

$$Ni(OH)_2 + OH^- \leftarrow NiOOH + H_2O + e^- \quad (2)$$

This reaction is not a complete reversible reaction. Thus a phenomenon occurs involving the suspension of discharge reaction at a valence (oxidation number) of 2.2 when nickel oxyhydroxide (NiOOH) is converted back to nickel hydroxide ($Ni(OH)_2$) during discharge. Accordingly, the negative electrode has always electricity left therein in an amount corresponding to a valence of 0.2. This remaining electricity makes no contribution to battery capacity.

A process for the reduction of the irreversible capacity of the negative electrode has been proposed in Japanese Patent No. 2,765,008. The process proposed in Japanese Patent No. 2,765,008 involves the use of a nickel oxide having a valence of greater than 2 (higher order nickel hydroxide) obtained by chemically and partly oxidizing nickel hydroxide as a positive active material. In this manner, the negative electrode has no electricity left therein as an irreversible content, making all electricity to contribute to battery capacity.

However, when the positive electrode prepared from a higher order nickel oxide (higher order nickel hydroxide) obtained by oxidizing nickel hydroxide as a positive active material is discharged, the resulting discharge capacity is lowered as compared with when the positive electrode prepared from the same amount of nickel hydroxide as a positive active material.

This is because when nickel hydroxide ($Ni(OH)_2$) is chemically oxidized, $\gamma$-NiOOH, which can hardly be electrochemically discharged, is produced besides $\beta$-NiOOH, which can be easily discharged, while when nickel hydroxide ($Ni(OH)_2$) is electrochemically oxidized (charged), it is converted to $\beta$-NiOOH, which can be easily discharged electrochemically. In this case, it is thought that $\gamma$-NiOOH has a low electrical conductivity and thus cannot be discharged itself and impairs the electrical conductivity of the positive active material, lowering the percent utilization of the entire positive active material and hence the discharge capacity of the battery.

SUMMARY OF THE INVENTION

Therefore, the present invention has been worked out to eliminate the foregoing problems. An object of the present invention is to provide a high capacity alkaline storage battery which exhibits a maintained dischargeability and a reduced excess negative electrode capacity by decreasing the content of $\gamma$-NiOOH left in higher order nickel oxide (higher order nickel hydroxide).

In order to solve the foregoing problems, the process for the preparation of the positive active material for alkaline storage battery according to the invention comprises an oxidizing step of chemically oxidizing nickel hydroxide, and a reducing step of reducing the higher order nickel hydroxide obtained by oxidation. By thus chemically oxidizing nickel hydroxide at an oxidizing step so that it is put in higher order, the excess negative electrode capacity can be reduced, making it possible to obtain a high capacity alkaline storage battery.

In this manner, chemical oxidation causes the production of $\beta$-NiOOH, which can easily be electrochemically discharged, and $\gamma$-NiOOH, which can hardly be electrochemically discharged. At the subsequent reducing step, the higher order nickel oxyhydroxides ($\beta$-NiOOH and $\gamma$-NiOOH) are reduced to nickel hydroxide ($Ni(OH)_2$). During reduction, $\gamma$-NiOOH can be reduced more easily than $\beta$-NiOOH. Thus, the content of $\gamma$-NiOOH is reduced, giving a relative rise in the content of $\beta$-NiOOH, which can easily be electrochemically discharged. In this arrangement, the electrical conductivity of the entire positive electrode can be enhanced to enhance the percent utilization of the active material and hence increase the discharge capacity, making it possible to obtain a high capacity alkaline storage battery.

The process for the preparation of a positive active material for alkaline storage battery according to the invention comprises a coating step of coating the surface of the nickel hydroxide with a cobalt compound, an oxidizing step of chemically oxidizing the nickel hydroxide, and a reducing step of reducing the higher order nickel hydroxide obtained by oxidation. By thus coating the surface of nickel hydroxide with a cobalt compound at a coating step, a good electrically-conductive network is formed in the positive electrode because the cobalt compound has a good electrical conductivity. Accordingly, the percent utilization of active material can be enhanced, making it possible to obtain a high capacity storage battery.

In this case, when the cobalt compound coated on the surface of nickel hydroxide is subjected to alkaline heat treatment so that it is converted to a higher order cobalt compound, a good electrically-conductive network can be further formed in the positive electrode because the higher order cobalt compound having a valence of greater than 2 has a better electrical conductivity than the cobalt compound. Thus, the percent utilization of active material can be further enhanced, making it possible to obtain a higher capacity storage battery.

When the average valence of the higher order nickel hydroxide is lower than 2.1 after the reduction process, the reduced amount of irreversible capacity of the negative electrode is not sufficient, making it impossible to effectively utilize the inner space of the battery. On the contrary, when the average valence of higher order nickel hydroxide is higher than 2.3 after the reduction process, the charged amount of the negative electrode is reduced, providing a battery depending on the negative electrode. The resulting battery shows a drastic drop of capacity. This means that the average valence of higher order nickel hydroxide is preferably from not lower than 2.10 to not greater than 2.30.

Further, by effecting the reducing step by chemical reduction with a reducing agent, a large amount of NiOOH can be reduced at once as compared with electrochemical reduction, making it possible to prepare this type of a positive active material at a high efficiency and a low cost.

DETAILED DESCRIPTION OF THE PREFERRED EMBODIMENTS

1. Preparation of Nickel Positive Electrode

(1) EXAMPLE 1

To an aqueous solution of a mixture of nickel sulfate, zinc sulfate and cobalt sulfate having a nickel content of 3 wt % and a cobalt content of 1 wt % based on 100 wt % of metallic nickel was added gradually an aqueous solution of sodium hydroxide with stirring. The pH value of the reaction solution was then stabilized to a range of from 13 to 14 to cause the crystallization of particulate nickel hydroxide. Subsequently, the particulate nickel hydroxide was washed three time with purified water in an amount of 10 times that of the particulate nickel hydroxide, dehydrated, and then dried to prepare a particulate nickel hydroxide active material.

Subsequently, to the particulate nickel hydroxide active material thus prepared was added dropwise sodium hypochlorite (NaClO) (oxidizing agent) while being stirred in a 32 wt-% aqueous solution of sodium hydroxide which had been kept at a temperature of from 40° C. to 60° C. so that nickel hydroxide as a main component was oxidized (put in higher order) to form higher order nickel hydroxide. The amount sodium hypochlorite (NaClO) to be added dropwise to the aqueous solution of sodium hydroxide was such that divalent nickel hydroxide is oxidized to trivalent nickel oxyhydroxide by 80 wt %. The particulate material (higher order nickel hydroxide) was then subjected to chemical analysis. As a result, the higher order nickel hydroxide was found to have a valence of 2.80 on the average.

Subsequently, to the aqueous solution in which a higher order particulate material (higher order nickel hydroxide) had been formed was added dropwise a predetermined amount of hydrogen peroxide ($H_2O_2$) (reducing agent) with stirring to reduce the higher order nickel hydroxide as a main component. The amount of hydrogen peroxide ($H_2O_2$) to be added dropwise to the aqueous solution was such that the trivalent nickel oxyhydroxide produced is reduced to divalent nickel hydroxide by 75 wt %. The particulate material thus produced (higher order nickel hydroxide) was then subjected to chemical analysis. As a result, the particulate material was found to have a valence of 2.20 on the average.

Subsequently, the foregoing active material was washed three times with purified water in an amount of 10 times that of the active material, dehydrated, and then dried to prepare a particulate higher order nickel hydroxide active material (positive active material). To this positive active material was then added 40 wt % of HPC (hydroxyl propyl cellulose) dispersion with stirring to prepare an active material slurry. This active material slurry was packed into a porous electrode substrate made of foamed nickel to a predetermined packing density (2.8 g/cm$^3$), dried, and then rolled to a predetermined thickness (0.70 mm) to prepare a non-sintered nickel positive electrode. The non-sintered nickel positive electrode thus prepared was then used as a nickel positive electrode a of Example 1.

(2) EXAMPLE 2

To an aqueous solution of a mixture of nickel sulfate, zinc sulfate and cobalt sulfate having a nickel content of 3 wt % and a cobalt content of 1 wt % based on 100 wt % of metallic nickel was added gradually an aqueous solution of sodium hydroxide with stirring in the same manner as in Example 1. The pH value of the reaction solution was then stabilized to a range of from 13 to 14 to cause the crystallization of particulate nickel hydroxide. Subsequently, to the solution in which nickel hydroxide had been eluted was added an aqueous solution of cobalt sulfate while the pH value of the reaction solution being kept to a range of from 9 to 10 to cause cobalt hydroxide to separate out with spherically oxide particles mainly composed of nickel hydroxide as crystal nuclei. The crystallized amount of cobalt hydroxide was 10% based on nickel hydroxide.

The crystal thus precipitated was collected, washed three time with purified water in an amount of 10 times that of the particulate nickel hydroxide, dehydrated, and then dried to prepare a particulate nickel hydroxide active material having a cobalt hydroxide coat layer. Subsequently, to the particulate nickel hydroxide active material thus prepared was added dropwise sodium hypochlorite (NaClO) (oxidizing agent) while being stirred in a 32 wt-% aqueous solution of sodium hydroxide which had been kept at a temperature of from 40° C. to 60° C. so that nickel hydroxide as a main component was oxidized (put in higher order) to form higher order nickel hydroxide.

The amount sodium hypochlorite (NaClO) to be added dropwise to the aqueous solution of sodium hydroxide was such that divalent nickel hydroxide is oxidized to trivalent nickel oxyhydroxide by 80 wt %. The particulate material (higher order nickel hydroxide) was then subjected to chemical analysis. As a result, the higher order nickel hydroxide was found to have a valence of 2.80 on the average.

Subsequently, to the aqueous solution in which a higher order particulate material (higher order nickel hydroxide) had been formed was added dropwise a predetermined amount of hydrogen peroxide ($H_2O_2$) (reducing agent) with stirring to reduce the higher order nickel hydroxide as a main component. The amount of hydrogen peroxide ($H_2O_2$) to be added dropwise to the aqueous solution was such that the trivalent nickel oxyhydroxide produced is reduced to divalent nickel hydroxide by 75 wt %. The particulate material thus produced (higher nickel hydroxide) was then subjected to chemical analysis. As a result, the particulate material was found to have a valence of 2.20 on the average.

Subsequently, the foregoing active material was washed three times with purified water in an amount of 10 times that of the active material, dehydrated, and then dried to prepare a particulate higher order nickel hydroxide active material (positive active material). To this positive active material was then added 40 wt % of HPC (hydroxyl propyl cellulose) dispersion with stirring to prepare an active material slurry. This active material slurry was packed into a porous electrode substrate made of foamed nickel to a predetermined packing density, dried, and then rolled to a predetermined thickness to prepare a non-sintered nickel positive electrode. The non-sintered nickel positive electrode thus prepared was then used as a nickel positive electrode b of Example 2.

(3) EXAMPLE 3

To an aqueous solution of a mixture of nickel sulfate, zinc sulfate and cobalt sulfate having a nickel content of 3 wt % and a cobalt content of 1 wt % based on 100 wt % of metallic nickel was added gradually an aqueous solution of sodium hydroxide with stirring in the same manner as in Example 1. The pH value of the reaction solution was then stabilized to a range of from 13 to 14 to cause the crystallization of particulate nickel hydroxide. Subsequently, to the solution in which nickel hydroxide had been eluted was added an aqueous solution of cobalt sulfate while the pH value of the reaction solution being kept to a range of from 9 to 10 to cause cobalt hydroxide to separate out with spherically oxide particles mainly composed of nickel hydroxide as crystal nuclei. The crystallized amount of cobalt hydroxide was 10% based on nickel hydroxide.

The crystal thus precipitated was collected, washed three time with purified water in an amount of 10 times that of the particulate nickel hydroxide, dehydrated, and then dried to obtain a particulate composite material having a cobalt hydroxide coat layer. Subsequently, onto the particulate composite material thus obtained was sprayed a 25 wt % aqueous solution of sodium hydroxide (NaOH) while being kept in an atmosphere of 100° C. air for 0.5 hours. In this manner, the cobalt hydroxide layer formed on the surface of the particulate nickel hydroxide was put in higher order to form a higher order cobalt compound layer. The particulate composite material was washed three times with purified water in an amount of 10 times that of the particulate composite material, dehydrated, and then dried to prepare a particulate nickel hydroxide active material having a higher order cobalt compound coat layer.

Subsequently, to the particulate nickel hydroxide active material having a higher order cobalt compound coat layer thus prepared was added dropwise sodium hypochlorite (NaClO) (oxidizing agent) while being stirred in a 32 wt-% aqueous solution of sodium hydroxide which had been kept at a temperature of from 40° C. to 60° C. so that nickel hydroxide as a main component was oxidized (put in higher order) to form higher order nickel hydroxide. The amount sodium hypochlorite (NaClO) to be added dropwise to the aqueous solution of sodium hydroxide was such that divalent nickel hydroxide is oxidized to trivalent nickel oxyhydroxide by 80 wt %. The particulate material (higher order nickel hydroxide) was then subjected to chemical analysis. As a result, the higher order nickel hydroxide was found to have a valence of 2.80 on the average.

Subsequently, to the aqueous solution in which a higher order particulate material (higher order nickel hydroxide) had been formed was added drop wise a predetermined amount of hydrogen peroxide ($H_2O_2$) (reducing agent) with stirring to reduce the higher order nickel hydroxide as a main component. The amount of hydrogen peroxide ($H_2O_2$) to be added dropwise to the aqueous solution was such that the trivalent nickel oxyhydroxide produced is reduced to divalent nickel hydroxide by 75 wt %. The particulate material thus produced (higher nickel hydroxide) was then subjected to chemical analysis. As a result, the particulate material was found to have a valence of 2.20 on the average.

Subsequently, the foregoing active material was washed three times with purified water in an amount of 10 times that of the active material, dehydrated, and then dried to prepare a particulate higher order nickel hydroxide active material (positive active material). To this positive active material was then added 40 wt % of HPC (hydroxyl propyl cellulose) dispersion with stirring to prepare an active material slurry. This active material slurry was packed into a porous electrode substrate made of foamed nickel to a predetermined packing density, dried, and then rolled to a predetermined thickness to prepare a non-sintered nickel positive electrode. The non-sintered nickel positive electrode thus prepared was then used as a nickel positive electrode c of Example 3.

(4) COMPARATIVE EXAMPLE 1

To an aqueous solution of a mixture of nickel sulfate, zinc sulfate and cobalt sulfate having a nickel content of 3 wt % and a cobalt content of 1 wt % based on 100 wt % of metallic nickel was added gradually an aqueous solution of sodium hydroxide with stirring in the same manner as in Example 1. The pH value of the reaction solution was then stabilized to a range of from 13 to 14 to cause the crystallization of particulate nickel hydroxide. Subsequently, the particulate nickel hydroxide was washed three time with purified water in an amount of 10 times that of the particulate nickel hydroxide, dehydrated, and then dried to prepare a particulate nickel hydroxide active material (positive active material). The particulate material (nickel hydroxide) was then subjected to chemical analysis. As a result, the particulate material was found to have a valence of 2.00 on the average.

To the positive active material thus obtained was then added 40 wt % of HPC (hydroxyl propyl cellulose) dispersion with stirring to prepare an active material slurry. This active material slurry was packed into a porous electrode substrate made of foamed nickel to a predetermined packing density, dried, and then rolled to a predetermined thickness to prepare a non-sintered nickel positive electrode. The non-sintered nickel positive electrode thus prepared was then used as a nickel positive electrode x of Comparative Example 1.

(5) COMPARATIVE EXAMPLE 2

To an aqueous solution of a mixture of nickel sulfate, zinc sulfate and cobalt sulfate having a nickel content of 3 wt % and a cobalt content of 1 wt % based on 100 wt % of metallic nickel was added gradually an aqueous solution of sodium hydroxide with stirring in the same manner as in Example 1. The pH value of the reaction solution was then stabilized to a range of from 13 to 14 to cause the crystallization of particulate nickel hydroxide. Subsequently, the particulate nickel hydroxide was washed three time with purified water in an amount of 10 times that of the particulate nickel hydroxide, dehydrated, and then dried to prepare a particulate nickel hydroxide active material.

Subsequently, to the particulate nickel hydroxide active material thus prepared was added dropwise sodium hypochlorite (NaClO) (oxidizing agent) while being stirred in a 32 wt-% aqueous solution of sodium hydroxide which had been kept at a temperature of from 40° C. to 60° C. so that nickel hydroxide as a main component was oxidized (put in higher order) to form higher order nickel hydroxide. The amount sodium hypochlorite (NaClO) to be added dropwise to the aqueous solution of sodium hydroxide was such that divalent nickel hydroxide is oxidized to trivalent nickel oxyhydroxide by 20 wt %. The particulate material (higher order nickel hydroxide) was then subjected to chemical analysis. As a result, the higher order nickel hydroxide was found to have a valence of 2.20 on the average.

Subsequently, the foregoing active material was washed three times with purified water in an amount of 10 times that of the active material, dehydrated, and then dried to prepare a particulate higher order nickel hydroxide active material (positive active material). To this positive active material was then added 40 wt % of HPC (hydroxyl propyl cellulose) dispersion with stirring to prepare an active material slurry. This active material slurry was packed into a porous electrode substrate made of foamed nickel to a predetermined packing density, dried, and then rolled to a predetermined thickness to prepare a non-sintered nickel positive electrode. The non-sintered nickel positive electrode thus prepared was then used as a nickel positive electrode y of Comparative Example 2.

2. Preparation of Hydrogen-Absorbing Alloy Negative Electrode

A mischmetal (Mm: mixture of rare earth elements), nickel, cobalt, aluminum and manganese were mixed at a ratio of 1:3.6: 0.6:0.2:0.6. The mixture was then induction-heated in an argon atmosphere in a radio frequency induction heating furnace to form a molten alloy. This molten alloy was cooled by a known method to prepare an ingot of hydrogen-absorbing alloy represented by the composition formula $Mn_{1.0}N_{3.6}Co_{3.6}Al_{0.2}Mn_{0.6}$. The ingot of hydrogen-absorbing alloy was then mechanically ground to a hydrogen-absorbing alloy powder having an average particle diameter of about 100 μm. To the hydrogen-absorbing alloy powder were then added a binder such as polyethylene oxide and a proper amount of water with stirring to prepare a hydrogen-absorbing alloy paste. The paste thus obtained was applied to a punched metal, dried, and then rolled to a thickness of 0.4 mm to prepare a hydrogen-absorbed alloy negative electrode.

3. Preparation of Nickel-Hydrogen Storage Battery

The non-sintered nickel positive electrodes a, b and c of Examples 1 to 3 and non-sintered nickel positive electrodes x and y of Comparative Examples 1 and 2 prepared as mentioned above and the foregoing hydrogen-absorbing alloy negative electrode were spirally wound with a separator made of a nonwoven polypropylene or nylon fabric provided interposed therebetween, respectively, to prepare spirally wound electrode blocks. These electrode blocks were each inserted into a battery case. Into the battery case was then injected a 30 wt % aqueous solution of potassium hydroxide as an electrolytic solution. The battery case was then sealed to prepare an AA-size nickel-hydrogen storage battery having a nominal capacity of 1,200 mAh.

The battery comprising the non-sintered nickel positive electrode a was used as a battery A of Example 1. The battery comprising the non-sintered nickel positive electrode b was used as a battery B of Example 2. The battery comprising the non-sintered nickel positive electrode c was used as a battery C of Example 3. The battery comprising the non-sintered nickel positive electrode x was used as a battery X of Comparative Example 1. The battery comprising the non-sintered nickel positive electrode y was used as a battery Y of Comparative Example 2.

4. Measurement of Discharge Capacity

Subsequently, the battery A of Example 1, the battery B of Example 2, the battery C of Example 3, the battery X of Comparative Example 1, and the battery Y of Comparative Example 2 were each charged with a current of 120 mA (0.1 C) for 16 hours, followed by 1 hour of suspension. These batteries were each then discharged with a current of 1,200 mA (1 C) to a voltage of 0.5 V. The discharge capacity was determined from the time required until the battery was fully discharged. The discharge capacity of these batteries were then calculated relative to that of the battery X of Comparative Example 1 as 100. The results are set forth in Table 1 below.

TABLE 1

| | | Mode of positive active material | | | | |
|---|---|---|---|---|---|---|
| Type of battery | Average valence | Oxidized? | Reduced? | Coated with cobalt? | Cobalt put in higher order? | Discharge capacity |
| A | 2.2 | Yes | Yes | No | No | 102 |
| B | 2.2 | Yes | Yes | Yes | No | 105 |
| C | 2.2 | Yes | Yes | Yes | Yes | 107 |
| X | 2.0 | No | No | No | No | 100 |
| Y | 2.2 | Yes | No | No | No | 94 |

As can be seen in the results of Table 1 above, the discharge capacity of the battery Y comprising the positive active material y of Comparative Example 2, which had been subjected to oxidation with an oxidizing agent (put in higher order) alone, is smaller than that of the battery X comprising the positive active material x of Comparative Example 1, which had not been subjected to oxidation. The reason for this phenomenon can be thought as follows. In other words, when the positive active material (nickel hydroxide) is oxidized with an oxidizing agent, β-NiOOH and γ-NiOOH are produced at the same time. The proportion of these products depends on the reaction conditions. Under the foregoing reaction conditions, the ratio of β-NiOOH and γ-NiOOH was 3:1.

Accordingly, when the positive active material is oxidized (chemically oxidized) with an oxidizing agent until the average valence reaches 2.2 as the positive active material y of Comparative Example 2, the positive active material comprises γ-NiOOH present therein in a proportion of about 5% (20%×¼). γ-NiOOH can hardly be electrostatically discharged and has a poor electrical conductivity. Thus, γ-NiOOH cannot be electrostatically discharged itself and impairs the electrical conductivity of the positive active material, lowering the percent utilization of the entire positive active material and hence lowering the discharge capacity.

On the other hand, the discharge capacity of the battery A comprising the positive active material a of Example 1, which had been subjected to oxidation (chemical oxidation) with an oxidizing agent, followed by the reduction with a reducing agent, was not lower than that of the battery X comprising the positive active material x of Comparative Example 1, which had not been subjected to oxidation. The reason for this phenomenon can be thought as mentioned above. In other words, the proportion of β-NiOOH to γ-NiOOH produced is 3:1. When the positive active material is chemically oxidized until the average valence reaches 2.8 as the positive active material a of Example 1, the positive active material comprises γ-NiOOH present therein in a proportion of about 20% (80%×¼).

When the positive active material is reduced with a reducing agent, NiOOH is reduced to $Ni(OH)_2$. However, the reduced ratio of β-NiOOH to γ-NiOOH is not 3:1. γ-NiOOH can be reduced more easily than β-NiOOH.

This is presumably because γ-NiOOH has a volume per unit weight of about 1.23 times that of β-NiOOH and thus can come in contact with the reducing agent more easily than β-NiOOH. In fact, it was found that when the positive active material is reduced from a valence of 2.8 to a valence of 2.2, the resulting positive active material comprises γ-NiOOH incorporated therein in a proportion of about 2.5%, which is about half that in the positive active material y of Comparative Example 2, which had been subjected to chemical oxidation alone.

Therefore, when the positive active material is subjected to chemical oxidation followed by reduction as the positive active material of Example 1, the content of γ-NiOOH, which can be hardly discharged and exhibits a poor electrical conductivity, decreases and the content of β-NiOOH, which can be easily discharged and exhibits a good electrical conductivity, increases. Accordingly, the battery A comprising the positive active material a of Example 1 exhibits an enhanced percent utilization of active material and hence an enhanced discharge capacity.

The comparison of the battery A comprising the positive active material a of Example 1 with battery B comprising the positive active material b of Example 2 and the battery C comprising the positive active material c of Example 3 shows that the discharge capacity of the batteries B and C are greater than that of the battery A.

This is presumably because the battery B has a cobalt hydroxide coat layer formed on the surface of the positive active material before the oxidation (arrangement to higher order) of the positive active material. Accordingly, cobalt hydroxide has a good electrical conductivity and thus forms a good electrically-conductive network in the positive electrode, providing an enhanced percent utilization of active material and hence an enhanced discharge capacity.

Referring to the battery C, the coat layer of cobalt hydroxide formed on the surface of the positive active material is subjected to alkaline heat treatment so that it is put in higher order to form a coat layer of higher order cobalt compound containing alkaline cation. Since the higher order cobalt compound containing alkaline cation exhibits a better electrical conductivity than cobalt hydroxide, a good electrically-conductive network can be formed more in the positive electrode, making it possible to further enhance the percent utilization of active material. Accordingly, the discharge capacity can be further enhanced.

5. Measurement of High Rate Discharge Capacity

Subsequently, the battery A of Example 1, the battery B of Example 2, the battery C of Example 13, the battery X of Comparative Example 1, and the battery Y of Comparative Example 2 were each charged with a current of 120 mA (0.1 C) for 16 hours, followed by 1 hour of suspension. These batteries were each then discharged with a current of 4,800 mA (4 C) to a voltage of 0.5 V. The discharge capacity during high rate discharge was determined from the time required until the battery was fully discharged. The discharge capacity of these batteries were then calculated relative to that of the battery X of Comparative Example 1 as 100. The results are set forth in Table 2 below.

TABLE 2

| | Mode of positive active material | | | | |
|---|---|---|---|---|---|
| Type of battery | Average valence | Oxidized? | Reduced? | Coated with cobalt? | Cobalt put in higher order? | Discharge capacity |
| A | 2.2 | Yes | Yes | No | No | 102 |
| B | 2.2 | Yes | Yes | Yes | No | 108 |
| C | 2.2 | Yes | Yes | Yes | Yes | 112 |
| X | 2.0 | No | No | No | No | 100 |
| Y | 2.2 | Yes | No | No | No | 90 |

As can be seen in the results of Table 2 above, the discharge capacity of the battery Y comprising the positive active material y of Comparative Example 2, which had been subjected to chemical oxidation alone, showed a drastic drop. This is presumably because the drop of electrical conductivity due to the presence of γ-NiOOH becomes remarkable with high rate discharge.

It can be also seen that the battery B comprising the positive active material b of Example 2 and the battery C comprising the positive active material c of Example 3 showed a drastic enhancement of discharge capacity. This is presumably because the battery B has a cobalt hydroxide coat layer formed on the surface of the positive active material to show an enhanced electrical conductivity, exerting an effect of enhancing capacity during high rate discharge.

Referring to the battery C, a coat layer of higher order cobalt compound containing alkaline cation having an enhanced electrical conductivity is formed on the surface of the positive active material, exerting an effect of further enhancing capacity during high rate discharge.

As mentioned above, in the invention, nickel hydroxide is oxidized with an oxidizing agent so that it is put in higher order. Nickel hydroxide which has thus been put in higher order is then chemically reduced. In this manner, chemical oxidation makes it possible to reduce the excess capacity of negative electrode, reducing the content of γ-NiOOH and hence enhancing the electrical conductivity of the interior of the positive electrode during reduction. Accordingly, the percent utilization of active material is enhanced to increase the discharge capacity, making it possible to obtain a high capacity alkaline storage battery.

The foregoing embodiment of implication of the present invention has been described with reference to the case where the positive active material is oxidized until the average valence reaches 2.8 and reduced until the average valence reaches 2.2. When the average valence of higher order nickel hydroxide is lower than 2.1 after the reduction process, the reduction of the irreversible capacity of the negative electrode is not sufficient, making it impossible to effectively utilize the inner space of the battery. On the contrary, when the average valence of higher order nickel hydroxide is higher than 2.3 after the reduction process, the charged amount of the negative electrode is reduced, providing a battery depending on the negative electrode. The resulting battery shows a drastic drop of capacity. This means that the average valence of higher order nickel hydroxide is preferably from not lower than 2.10 to not greater than 2.30.

While the foregoing embodiment of implication of the present invention has been described with reference to the case where as the oxidizing agent for oxidation there is used sodium hypochlorite, similar effect was exerted even when oxidizing agents other than sodium hypochlorite, e.g., sodium persoxodisulfate ($Na_2S_2O_8$) and potassium persoxodisulfate ($K_2S_2O_8$) were used. While the foregoing embodiment of implication of the present invention has been described with reference to the case where as the reducing agent for reduction there is used hydrogen peroxide, similar effect was exerted even when reducing agents other than hydrogen peroxide, e.g., hydrazine and hydrogen iodide were used.

Further, while the foregoing embodiment of implication of the present invention has been described with reference to the case where the invention is applied to nickel-hydrogen storage battery, the present invention is not limited to nickel-hydrogen storage battery and similar effect can be expected even when the present invention is applied to other alkaline storage batteries such as nickel-cadmium storage battery.

What is claimed is:

1. A manufacturing method of a positive active material for alkaline storage battery including nickel hydroxide as a main component and β-NiOOH, said method comprising:
   an oxidizing step of chemically oxidizing said nickel hydroxide to produce a higher order nickel hydroxide, an average valence of which is 2.8, including nickel hydroxide, β-NiOOH and γ-NiOOH; and
   a reducing step of reducing the higher order nickel hydroxide obtained by said oxidizing step, wherein at least one of hydrogen peroxide, hydrazine and hydrogen iodide is used as a reducing agent, to produce a higher order nickel including nickel hydroxide and β-NiOOH, an average valence thereof after reduction being not less than 2.1 and not greater than 2.3.

2. A manufacturing method of a positive active material for alkaline storage battery including nickel hydroxide as a main component and β-NiOOH, said method comprising:
   a coating step of coating the surface of said nickel hydroxide with a cobalt compound;
   an oxidizing step of chemically oxidizing said nickel hydroxide obtained by said coating step to produce a higher order nickel hydroxide, an average valence of which is 2.8, including nickel hydroxide, β-NiOOH and γ-NiOOH; and
   a reducing step of reducing the higher order nickel hydroxide obtained by said oxidizing step, wherein at least one of hydrogen peroxide, hydrazine and hydrogen iodide is used as a reducing agent, to produce a higher order nickel including nickel hydroxide and β-NiOOH, an average valence thereof after reduction being not less than 2.1 and not greater than 2.3.

3. A manufacturing method of a positive active material for alkaline storage battery including nickel hydroxide as a main component and β-NiOOH, said method comprising:
   a coating step of coating the surface of said nickel hydroxide with a cobalt compound;
   a high-ordering step of subjecting said cobalt compound to alkaline heat treatment so that said cobalt compound is in a higher order;
   an oxidizing step of chemically oxidizing said nickel hydroxide coated with said higher order cobalt compound to produce a higher order nickel hydroxide, an average valence of which is 2.8, including nickel hydroxide, β-NiOOH and γ-NiOOH; and
   a reducing step of reducing the higher order nickel hydroxide obtained by said oxidizing step, wherein at least one of hydrogen peroxide, hydrazine and hydrogen iodide is used as a reducing agent, to produce a higher order nickel including nickel hydroxide and β-NiOOH, an average valence thereof after reduction being not less than 2.1 and not greater than 2.3.

* * * * *